(12) United States Patent
Hooper et al.

(10) Patent No.: US 9,441,657 B2
(45) Date of Patent: Sep. 13, 2016

(54) MANUFACTURE AND METHOD FOR FORMING STRUCTURES AND THE STRUCTURES RESULTING THEREFROM

(71) Applicant: Alcoa Inc., Pittsburgh, PA (US)

(72) Inventors: William J. Hooper, Lawrenceville, GA (US); Ion-Horatiu Barbulescu, Atlanta, GA (US); William Ling, Norcross, GA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 14/992,381

(22) Filed: Jan. 11, 2016

(65) Prior Publication Data

US 2016/0123364 A1 May 5, 2016

Related U.S. Application Data

(63) Continuation of application No. 14/032,722, filed on Sep. 20, 2013.

(51) Int. Cl.
| | |
|---|---|
| *E06B 3/968* | (2006.01) |
| *F16B 7/04* | (2006.01) |
| *F16B 5/06* | (2006.01) |
| *B23P 15/00* | (2006.01) |
| *F16B 12/44* | (2006.01) |
| *F16B 12/50* | (2006.01) |
| *F16B 7/18* | (2006.01) |
| *F16B 7/22* | (2006.01) |

(52) U.S. Cl.
CPC .............. *F16B 7/0446* (2013.01); *B23P 15/00* (2013.01); *F16B 5/0614* (2013.01); *F16B 7/18* (2013.01); *F16B 7/22* (2013.01); *F16B 12/44* (2013.01); *F16B 12/50* (2013.01); *Y10T 24/44* (2015.01); *Y10T 29/49959* (2015.01); *Y10T 403/42* (2015.01)

(58) Field of Classification Search
CPC ...... E06B 3/964; E06B 3/9642; E06B 3/968; E06B 3/9684; F16B 7/044; F16B 7/0446
See application file for complete search history.

(56) References Cited

U.S. PATENT DOCUMENTS

| | | | | |
|---|---|---|---|---|
| 3,307,294 | A | * 3/1967 | Bienenfeld | ........... E06B 3/5828 49/381 |
| 3,392,689 | A | 7/1968 | Ferdinand et al. | |
| 3,592,493 | A | * 7/1971 | Goose | .................. B62D 33/044 403/247 |
| 3,662,808 | A | 5/1972 | Edeus | |
| 3,778,175 | A | * 12/1973 | Zimmer | ............... B62D 33/044 403/187 |

(Continued)

OTHER PUBLICATIONS

Jacknob Corp. Toilet Partition Hardware, Online Catalog, Apr. 2, 2009, Retrieved from Internet Nov. 25, 2014, URL: http://mww.jacknob.com/pdf/Jacknob_Catalog_906.pdf.

(Continued)

*Primary Examiner* — Michael P Ferguson
(74) *Attorney, Agent, or Firm* — Greenberg Traurig, LLP

(57) ABSTRACT

A clip for assembling corners of hollow members such as the rails and stiles of an extruded aluminum door. The clip has a double L shape. A portion of the clip inserts into the hollow of a first member and is attached thereto. Another U-shaped portion defining the bottom of the double L extends into the other hollow member for attachment thereto to form a sturdy joint without welding. The first member may have a slot that receives the clip and the clip may be shaped to conform to the internal surfaces of one or both members. Clips may be used at each corner.

20 Claims, 16 Drawing Sheets

(56) References Cited

U.S. PATENT DOCUMENTS

| | | |
|---|---|---|
| 4,278,361 A | 7/1981 | Steinke |
| 4,509,294 A | 4/1985 | Boilard |
| 4,676,686 A | 6/1987 | Eisenloffel |
| 4,740,098 A | 4/1988 | Witt |
| 4,809,469 A | 3/1989 | Klein |
| 5,010,708 A | 4/1991 | Evans et al. |
| 5,509,361 A | 4/1996 | Chen |
| 5,671,580 A * | 9/1997 | Chou .................. E06B 3/968 403/230 |
| 5,737,887 A | 4/1998 | Smeenge |
| 5,875,600 A * | 3/1999 | Redman ............. E06B 3/9642 403/230 |
| 6,253,507 B1 | 7/2001 | Martino |
| 6,585,448 B2 | 7/2003 | Grossman |
| 7,217,058 B2 | 5/2007 | Herb |
| 8,046,957 B2 | 11/2011 | Towersey et al. |
| 9,086,083 B2 | 7/2015 | Hooper |
| 2010/0186346 A1* | 7/2010 | Bratton ................. E04B 1/28 52/831 |
| 2010/0300016 A1 | 12/2010 | Eickhof |
| 2015/0082609 A1 | 3/2015 | Hooper |
| 2015/0275947 A1 | 10/2015 | Hooper et al. |

OTHER PUBLICATIONS

PCT International Search Report and Written Opinion, Dec. 30, 2014, PCT/US2014/056443, International Filing Date Sep. 19, 2014.

* cited by examiner

MANUFACTURE AND METHOD FOR FORMING STRUCTURES AND THE STRUCTURES RESULTING THEREFROM

CROSS-REFERENCE TO RELATED APPLICATIONS

This is a continuation of application Ser. No. 14/032,722, filed Sep. 20, 2013, entitled Manufacture and Method For Forming Structures and the Structures Resulting Therefrom, which application is incorporated by reference herein in its entirety.

FIELD

The present invention relates to joinery methods and manufactures for assembling structures and more particularly, to such methods and manufactures applied to the task of assembling structures, such as doors, windows and frames, from members conjoined at an angle, e.g., perpendicular to one another.

BACKGROUND

Various manufactures and methods are known for joining adjacent members, such as welding, mortise and tenon joints, the use of threaded fasteners extending through the adjacent ends of the members, etc. As applied to metal structures, such as metal doors, traditional welding methods of the stiles to the rails is labor and skill intensive, costly, and often causes discoloration and distortion of pre-finished members. The use of full-width tie rods in conjunction with corner fittings requires multiple fittings and assembly is time consuming and costly. Improved and/or alternative methods and devices for joinery therefore remain desirable.

SUMMARY

The disclosed subject matter relates to a structure having a first member with an open end and an interior hollow, the open end communicating with the interior hollow thereof, a first wall, a second wall and a third wall conjoining with the first wall on opposite sides thereof defining an interior shape of the first member proximate the first wall; a second member having an interior hollow and an open end, the open end communicating with the interior hollow thereof; a clip attaching the first member to the second member, the clip having a first leg and a second leg, conjoined at a first angle forming a first conjunction, a third leg attached to the second leg at an end thereof distal to the first leg forming a second conjunction, the third leg extending along the second leg proximate and substantially parallel to a surface thereof in a direction from the second conjunction toward the first leg and a fourth leg extending from a third conjunction with the third leg distal to the second conjunction, the fourth leg extending parallel to the first leg along a portion of the length of the first leg with a spacing between the fourth leg and the first leg accommodating the first wall of the first member there between, the first leg inserted into the hollow in the first member and positioned against the first wall of the first member, the first leg of the clip abutting against the first wall of the first member, mating with the interior shape of the first member proximate the first wall, and being fastened to the first member, the fourth leg being fastened to the first wall of the first member, the second leg extending outside the interior hollow of the first member, inserting into the open end of the second member and being fastened to the second member.

In another embodiment, a fifth leg is attached to the fourth leg at an end thereof distal to the third leg forming a third conjunction, the fifth leg extending distal to the first leg and substantially parallel to the direction of extension of the third leg, the third leg, fourth leg and fifth leg forming a U-shape, the second leg, third leg and fifth leg extending into the open end of the second member.

In another embodiment, the first, second, third, fourth and fifth legs are each formed from a continuous metal strip.

In another embodiment, the second member has first and second substantially parallel walls bridged by a connecting wall, the first wall of the second member fastened to the second leg of the clip and the second wall of the second member fastened to the fifth leg.

In another embodiment, the first leg and the fourth leg of the clip have fastener apertures therein that align with an aperture in the first wall of the first member, wherein the second and third legs have apertures that align with an aperture in the first wall of the second member, and wherein the fifth leg has an aperture therein which aligns with an aperture in the second wall of the second member and further comprising a plurality of fasteners extending through the aligned apertures of the clip and the first and second members securing the clip to the first member and the second member.

In another embodiment, the fasteners are blind rivets.

In another embodiment, a pair of support wings extend from opposite sides of the first leg, the support wings mating with the interior shape of the first member.

In another embodiment, each of the support wings include a connector portion that extends at an angle from the first leg and a lip that extends at an angle from the connector portion.

In another embodiment, the connector portion extends at about 90° from the first leg and the lip extends at about 90° from the connector portion.

In another embodiment, the first wall of the first member has a slot accommodating the clip at a position spaced above an end of the first member.

In another embodiment, the first wall of the first member has a shallow U-shaped cross-sectional shape having a bottom portion and a pair of short end portions and wherein opposing outer edges of the first conjunction are relieved and the widths of the first leg and the first conjunction approximate the width of the bottom portion of the shallow U-shape allowing the first leg to be accommodated between the end portions of the shallow U-shape.

In another embodiment, the second wall of the second member has a shallow U-shaped cross-sectional shape having a bottom portion and a pair of short end portions and wherein opposing outer edges of the third conjunction are relieved and the width of the fifth leg and the third conjunction approximate the width of the bottom portion of the shallow U-shape of the second wall of the second member, allowing the fifth leg to be accommodated between the end portions of the shallow U-shape.

In another embodiment, the second member has a fourth wall parallel to and spaced from the connecting wall and bridging between the first wall and the second wall of the second member to define a tubular structure, the second leg and third leg of the clip being fastened to the first wall of the second member and the fifth leg of the clip being fastened to the second wall of the second member, the width of the second leg and the third leg approximating the distance between the fourth wall and the connecting wall of the second member.

In another embodiment, a structure has a first member with an interior hollow and an aperture in a first wall thereof communicating with the interior hollow, a second wall and a third wall of the first member conjoining with the first wall on opposite sides thereof defining an interior shape of the first member proximate the first wall, the first wall of the first member having a shallow U-shaped cross-sectional shape having a bottom portion of the U-shape and a pair of short end portions of the U-shape;

a second member having an interior hollow and an open end, the open end communicating with the interior hollow thereof; a clip attaching the first member to the second member, the clip having a first leg and a second leg, conjoined at a first angle forming a first conjunction, the first leg inserted into the hollow in the first member and positioned against the first wall of the first member proximate the aperture of the first wall of the first member, the first leg of the clip abutting against the first wall of the first member and being fastened to the first member, the first leg mating with the interior shape of the first member proximate the first side wall, the widths of the first leg and the first conjunction approximating the width of the bottom portion of the U-shape allowing the first leg to be accommodated between the end portions of the U-shape, a pair of support wings extending from opposite sides of the first leg, the support wings mating with the interior shape of the first member and overlapping the short end portions of the U-shape, the second leg extending outside the interior hollow of the first member, inserting into the open end of the second member and being fastened to the second member.

In another embodiment, each of the support wings include a connector portion that extends at an angle from the first leg and a lip that extends at an angle from the connector portion.

In another embodiment, the clip has a plurality of fastener apertures formed therein and the first member and the second member each have at least one fastener aperture therein, the plurality of fastener apertures of the clip and the apertures in the first member and the second member being aligned in an assembly orientation, and further including a plurality of fasteners inserted through the aligned fastener apertures of the clip and the first and second members to fasten the first and second members to the clip.

In another embodiment, the first and second members are tubular extrusions of aluminum alloy.

In another embodiment, the structure is a portion of a door.

In another embodiment, a structure includes a first tubular member having an interior hollow and an open end communicating with the interior hollow, a first wall, a second wall and a third wall conjoining with the first wall on opposite sides thereof defining an interior shape of the first member proximate the first wall; a second tubular member having an interior hollow and an open end, the open end communicating with the interior hollow thereof; a clip attaching the first member to the second member, the clip having a first leg and a second leg, conjoined at a first angle forming a first conjunction, the first leg inserted into the hollow in the first member and positioned against the first wall of the first member, the first leg of the clip abutting against the first wall of the first member and being fastened to the first member, the first leg mating with the interior shape of the first member proximate the first wall, the second leg extending outside the interior hollow, inserting into the open end of the second member and being fastened to the second member, a third leg attached to the second leg at an end thereof distal to the first leg forming a second conjunction, the third leg extending along the second leg proximate and substantially parallel to a surface thereof in a direction from the second conjunction toward the first leg and a fourth leg extending from a third conjunction with the third leg distal to the second conjunction, the fourth leg extending parallel to the first leg along a portion of the length of the first leg with a spacing between the fourth leg and the first leg accommodating the first wall of the first member there between, the fourth leg being fastened to the first wall of the first member, a fifth leg attached to the fourth leg at an end thereof distal to the third leg forming a third conjunction, the fifth leg extending distal to the first leg and substantially parallel to the direction of extension of the third leg, the third leg, fourth leg and fifth leg forming a U-shape, the second leg, third leg and fifth leg extending into the open end of the second member and attaching thereto.

In another embodiment, the first wall of the first member has a shallow U-shaped cross-sectional shape having a bottom portion of the U-shape and a pair of short end portions of the U-shape and wherein opposing outer edges of the first conjunction are relieved, and the widths of the first leg and the first conjunction approximate the width of the bottom portion of the U-shape allowing the first leg to be accommodated between the end portions of the U-shape and wherein the second wall of the second member has a shallow U-shaped cross-sectional shape having a bottom portion of the U-shape and a pair of short end portions of the U-shape and wherein opposing outer edges of the third conjunction are relieved and the width of the fifth leg and the third conjunction approximate the width of the bottom portion of the U-shape of the second wall of the second member, allowing the fifth leg to be accommodated between the end portions of the U-shape.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

The present disclosure describes a clip and clip installation process that may be used in conjunction with fasteners to assemble a frame joint from component members. In one embodiment, the dip may be used to join a stile and rail of a door or window frame, e.g., made from hollow members, such as extrusions made from aluminum alloy. The clip may be used to align vertical and horizontal components relative to each other, allowing them to be joined at the proper angle. The clip may be used to join members of various lengths, such as tall/short top and bottom rails, allowing a variety of structures to be assembled using a common clip, e.g., to produce a variety of frames of different dimensions. The clip may be made from plastic, aluminum or steel depending on the strength needed for the joint connection. In those applications where high strength, low cost and formability are required, steel can be used. Progressive, one-piece steel stamping designs are presented herein, but fabricated steel, machined aluminum, machined plastic, extruded or cast aluminum and extruded or cast plastics could also be used for forming the clip. The present disclosure includes clip installation methods that could be categorized as: inside mounting, outside mounting or slide-in mounting. In one embodiment, the clip may be attached to the members to be joined through the use of blind fasteners. The fastener dimensions may be selected to provide the required strength for the application and may be set using a hydraulic or pneumatic gun, eliminating welding and the inherent heat related problems that it creates. Other types of fasteners can be used for attachment, such as screws, bolts, rivets, spot welds, etc. Typically, the use of the clip and methods of the present disclosure allow a reduction in the number of parts required to join members into a frame structure over conventional approaches. The avoidance of welding may also lead to reductions in labor costs and required skill levels, assembly time, number of parts to assemble and stock, manufacturing costs, rework and scrap. The ease of assembly provided by the clip may also allow assembly to take place in the field versus in the factory.

Figure 1:
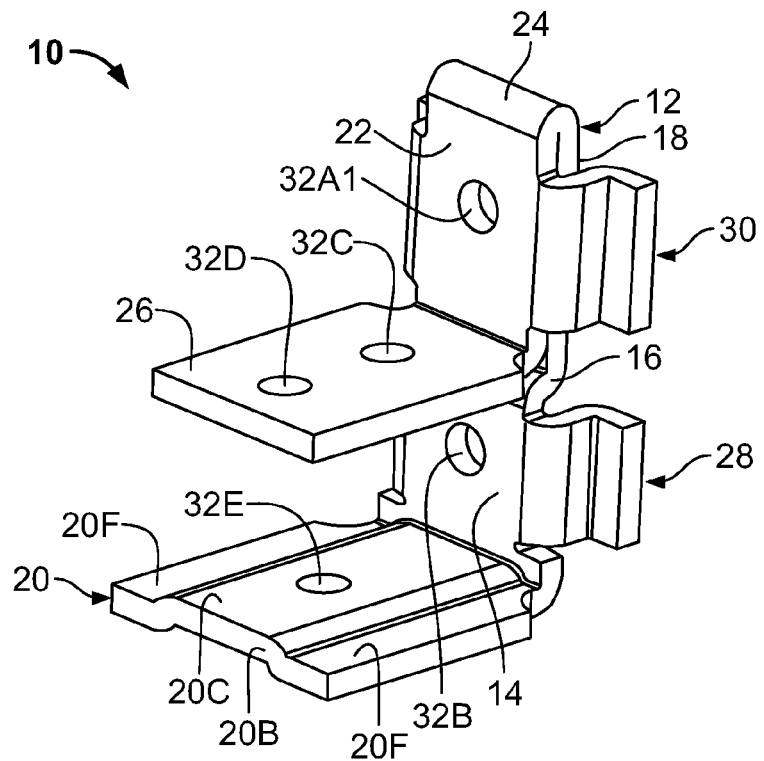
FIG. 1 is perspective view of a clip for assembling members in accordance with an embodiment of the present disclosure.
Figure 2:
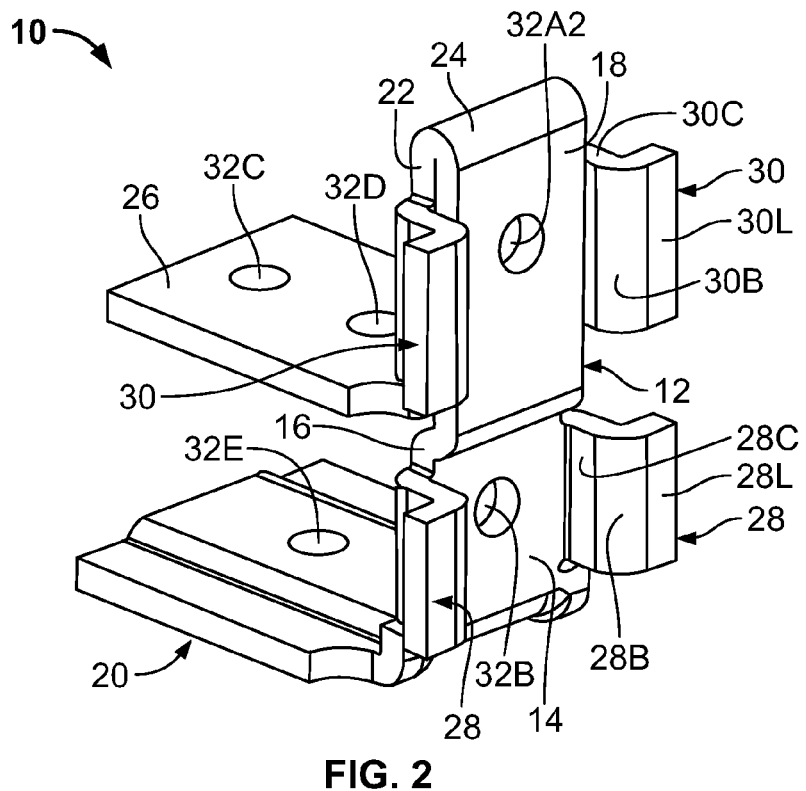
FIG. 2 is a perspective view of the clip of FIG. 1 looking from another direction.
Figure 5:
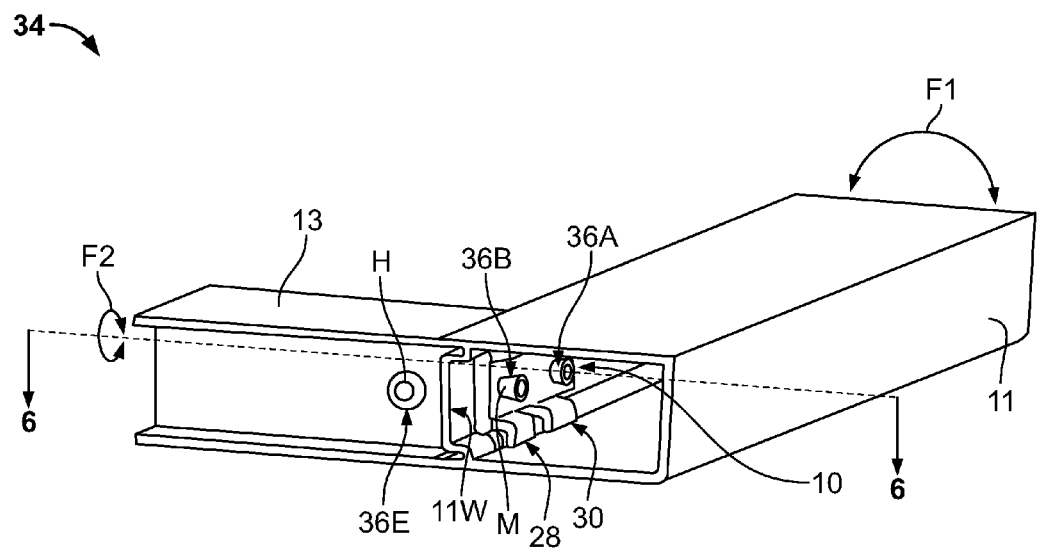
FIG. 5 is a perspective view of the clip and hollow member of FIGS. 3 and 4 coupled to an adjacent member to form an assembly.
Figure 6:
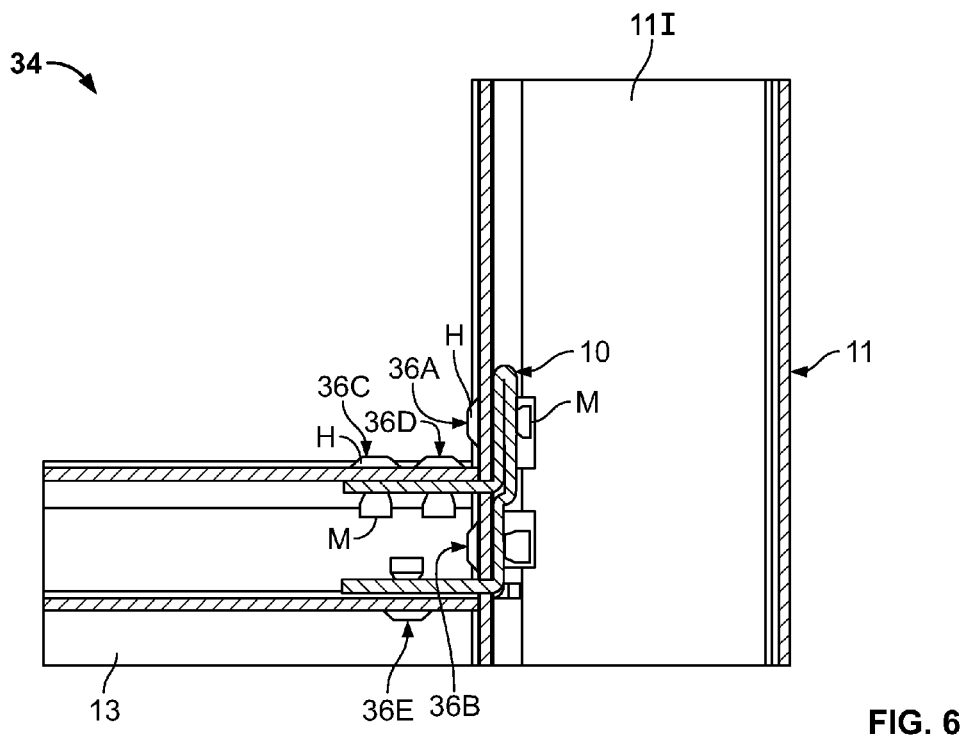
FIG. 6 is a cross-sectional view of the assembly of FIG. 5.
Figure 7:
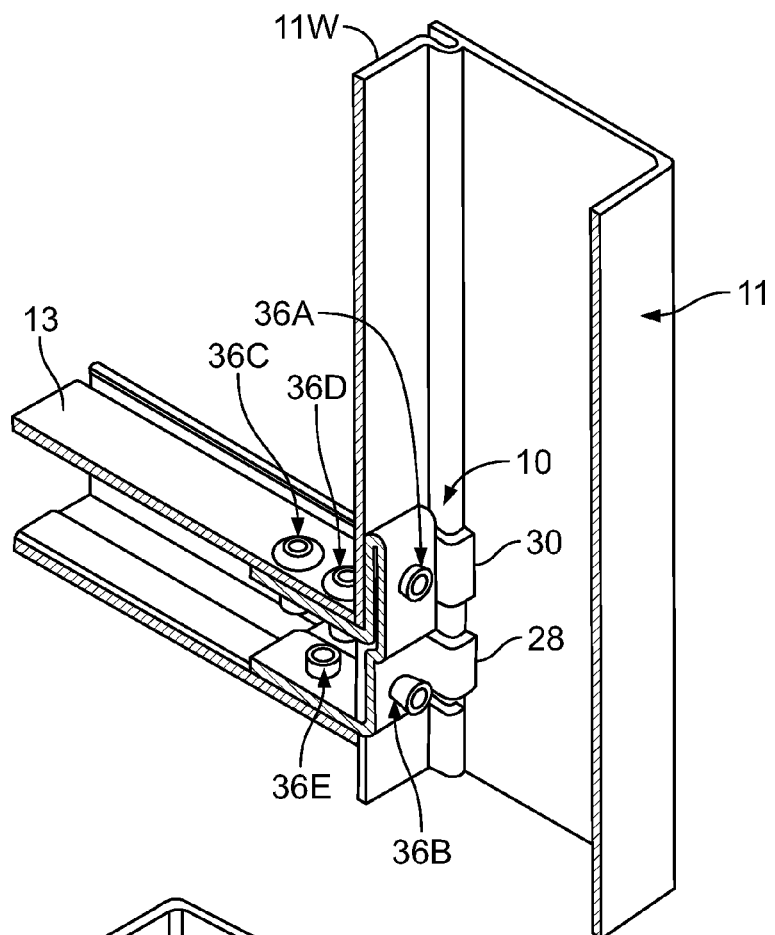
FIG. 7 is a perspective view of the cross-section of the assembly of FIG. 6.
Figure 8:
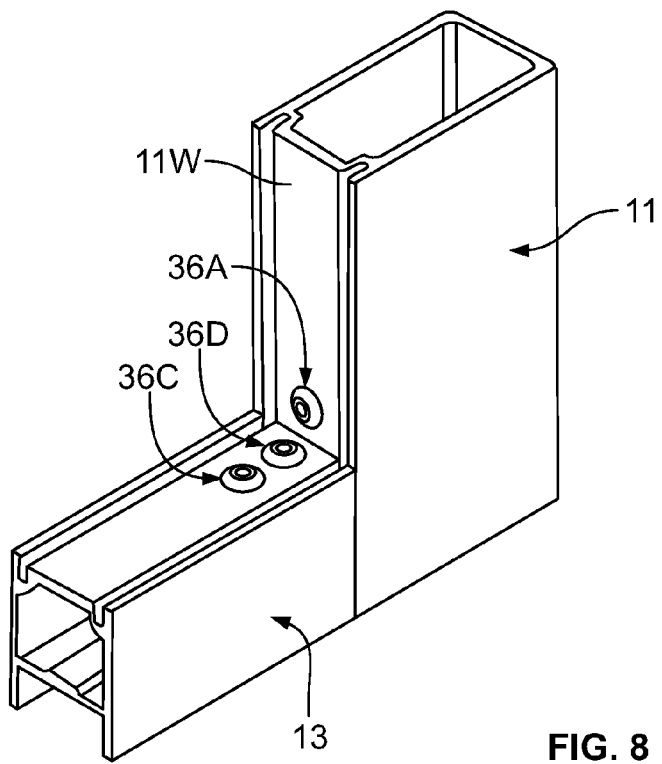
FIG. 8 is a perspective view of the assembly of FIGS. 5-7 viewed from another direction.

FIGS. 1 and 2 show a clip 10 for assembling members 11, 13 (see FIG. 5) in accordance with an embodiment of the present disclosure. The clip 10 could be described as having a stacked or double L configuration with a first leg 12 having a first panel 14, an offset 16 and a second panel 18. A second leg 20 extends at an angle, e.g., 90 degrees from the first panel 14, defining the bottom portion of a first L shape and a third panel 22 depends from a reverse curve 24, such that the third panel 22 extends parallel to the second panel 18 and in line with the first panel 14. The offset 16 has dimensions approximating the thickness of the third panel 22 and permits the third panel 22 to be in line with the first panel 14. A third leg 26 extends from the third panel 22 at an angle, e.g., 90 degrees, forming in conjunction with the third panel 22, another L shape that nests (with a space between second leg 20 and third leg 26) with the L shape formed by the first leg 12 and the second leg 20. The second leg 20 has a flattened U shaped cross-section with a central area 20C, bends 20B and flat portions 20F that overall provide a stiffening function and may mate in complementary fashion with interior surfaces of the member 13. A pair of support wings 28 extend from opposite sides of the first panel 14 with a connected portion 28C extending at an angle, e.g., 90 degrees relative to the first panel 14 to a bend 28B of, e.g., 90 degrees from which extends a lip 28L. A similar pair of support wings 30 with portions 30C, 30B and 30L extend in a similar manner from third panel 22. Holes 32A1-32E permit the passage of fasteners (not shown) like rivets, screws, bolts, etc. through the clip 10.

Figure 3:
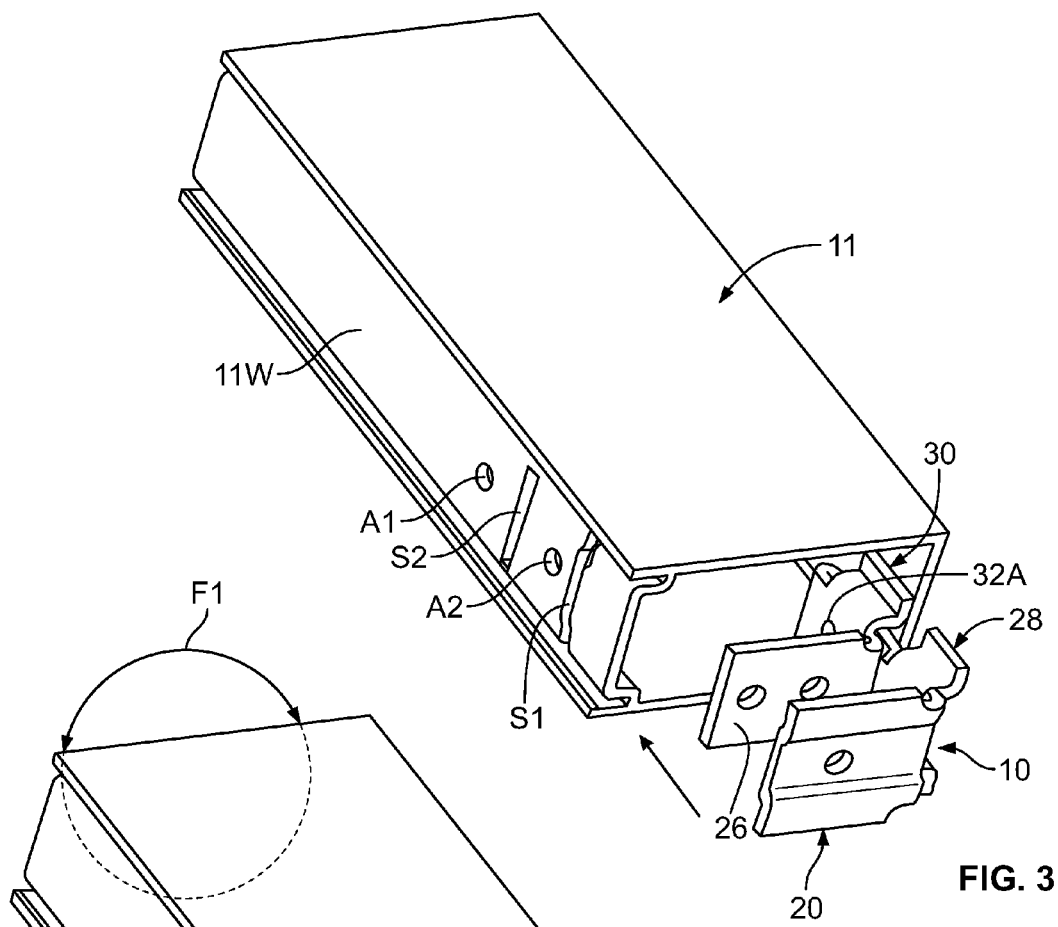
FIG. 3 is a perspective view of the clip of FIGS. 1 and 2 in position for insertion into a first hollow member.
Figure 4:
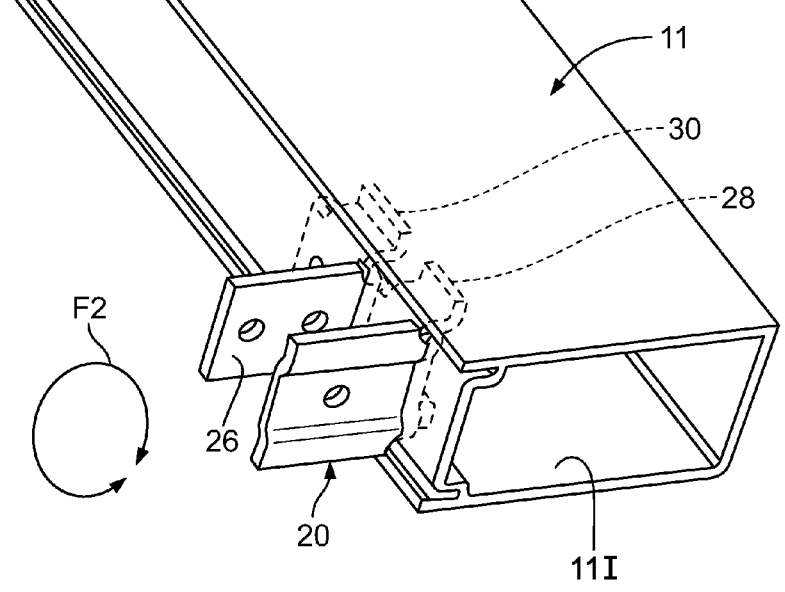
FIG. 4 is a partially phantom perspective view of the clip of FIG. 3 positioned within the first hollow member.

FIGS. 3 and 4 show the installation of the clip 10 into a hollow structural member 11 that may be made, e.g., from extruded aluminum or plastic. The member 11 has a wall 11W with a shallow U cross sectional shape. Slots S1, S2 in the wall 11W receive the second leg 20 and the third leg 26, respectively, there through and apertures A1, A2 align with apertures 32A1/32A2 and, 32B of the clip 10. Because the clip 10 is inserted into the hollow member 11 and then the second leg 20 and third leg 26 are extended through the slots S1, S2, the arrangement can be designated an "inside mount" of the clip 10. When fully inserted into the slots S1, S2, the support wings 28, 30, being complementarily shaped relative to the shallow U shaped wall 11W, bear against the wall 11W and/or the interior 11I of the member 11 to resist torsional forces F1, F2 (clockwise or counterclockwise, see FIG. 5 also) that may be exerted on the clip 10 and members 11, 13. The slots S1, S2 and apertures A1, A2 may be punched, drilled or machined into the wall 11W.

FIGS. 5-8 show an assembly 34 formed from members 11, 13 conjoined by clip 10 and fasteners 36A-36E. The fasteners 36A-36E may be "blind fasteners," such as pop rivets that can be applied from one side of an assembly and have a head portion H, which is larger than the apertures A1, A2 in member 11 (member 13 having similar apertures) and an expandable portion M, which is inserted through aligned apertures, e.g., A1 and 32A1, 32A2 and then expanded (by pulling on a central, breakable core pin with a swage tip) to enlarge the expandable portion M to a dimension larger than the apertures A1, 32A1, 32A2, clamping the member 11 to the clip 10. Blind fasteners do not require access to the side of the assembly 34 opposite to the head portion H. The member 13 is similarly held to the clip 10 by the action of fasteners 36C, 36D and 36E. Other types of fasteners 36 may be used, such as machine or self-threading screws or bolts with mating nuts.

Figure 9:
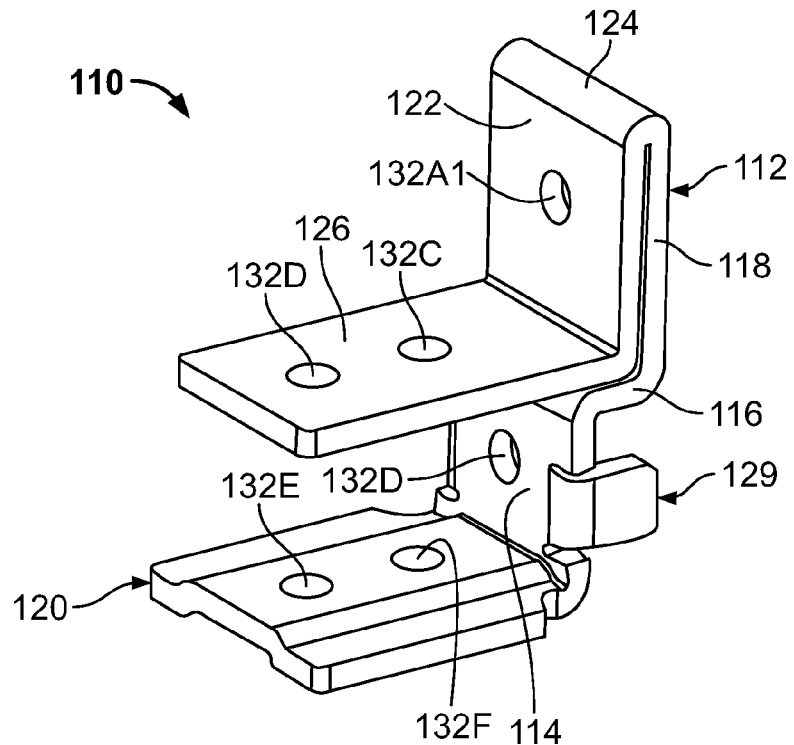
FIG. 9 is perspective view of a clip for assembling members in accordance with another embodiment of the present disclosure.
Figure 10:
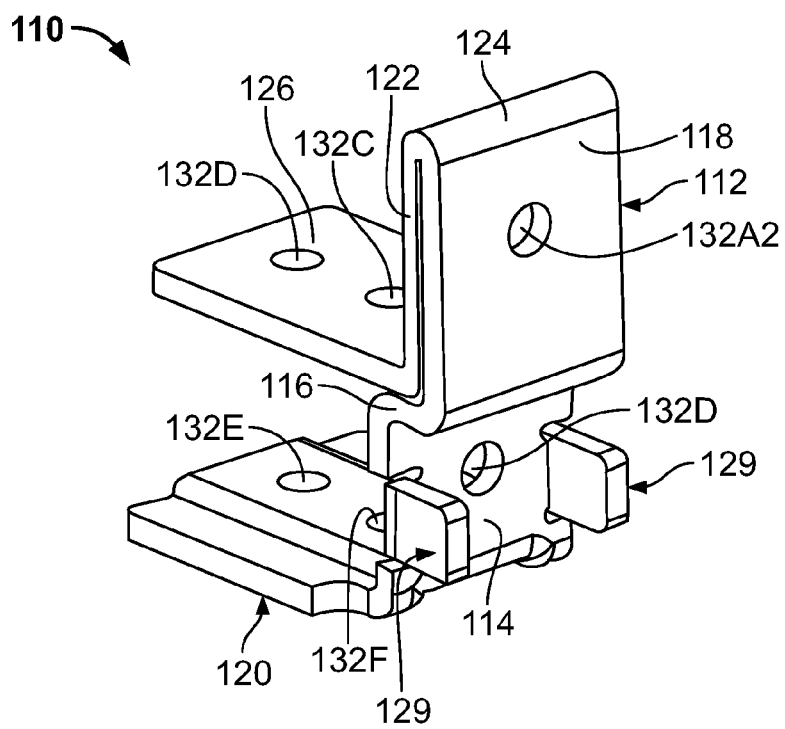
FIG. 10 is a perspective view of the clip of FIG. 9 looking from another direction.

FIGS. 9 and 10 show a clip 110 for assembling members 111, 113 (see FIG. 14) in accordance with an embodiment of the present disclosure. The clip 110 could be described as having a stacked or double L configuration with a first leg 112 having a first panel 114, an offset 116 and a second panel 118. A second leg 120 extends at an angle, e.g., 90 degrees from the first panel 114, defining the bottom portion of a first L shape and a third panel 122 depends from a reverse curve 124, such that the third panel 122 extends parallel to the second panel 118 offset from the plane occupied by the first panel 114. The offset 116 has dimensions approximating the thickness of the third panel 122 plus the thickness of the member 111 (wall 111W) and permits the third panel 122 to abut against the interior surface of the wall 111W while the first panel 114 abuts the exterior surface of the wall 111W, when the clip 110 is installed on member 111 (See FIG. 13). A third leg 126 extends from the third panel 122 at an angle, e.g., 90 degrees, forming in conjunction with the third panel 122, another L shape that nests (with a space between second leg 120 and third leg 126) with the L shape formed by the first leg 112 and the second leg 120. The second leg 120 has a flattened U shaped cross-section like second leg 20 of FIG. 1. A pair of support wings 129 extend from opposite sides of the first panel 114 extending at an angle, e.g., 90 degrees relative to the first panel 114. Holes 132A1-132E permit the passage of fasteners like rivets, screws, bolts, etc. through the clip 10. Additional holes, like 132F (only shown in FIGS. 9 and 10) may be made to accommodate additional fasteners.

Figure 11:
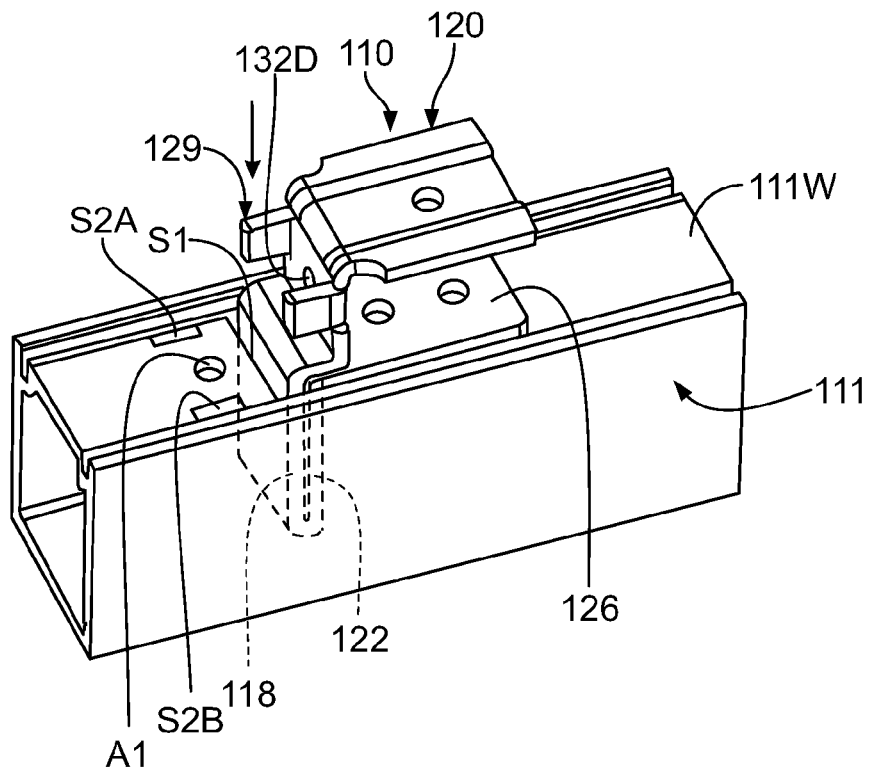
FIG. 11 is a partially phantom, perspective view of the clip of FIGS. 9 and 10 in a first insertion position into a slot in a first hollow member.
Figure 12:
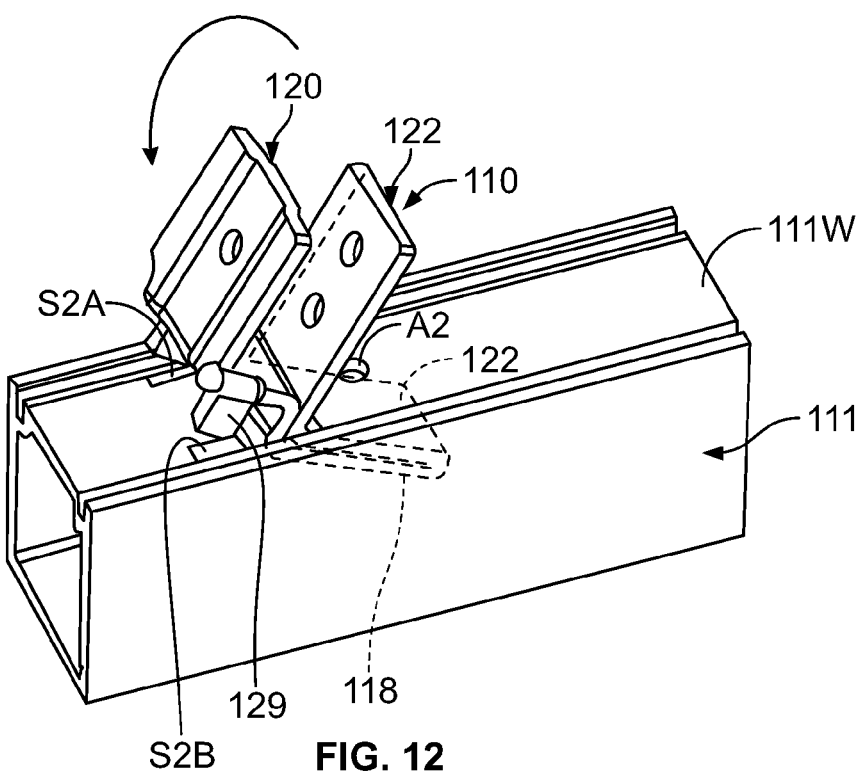
FIG. 12 is a partially phantom, perspective view of the clip of FIG. 11 as it is rotated into a second insertion position within the first hollow member.
Figure 13:
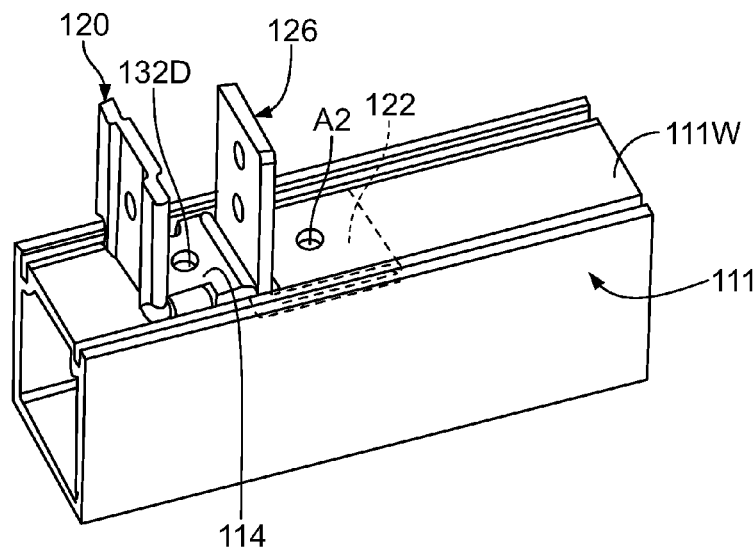
FIG. 13 is a partially phantom perspective view of the clip of FIGS. 11 and 12 in the second insertion position within the first hollow member.

FIGS. 11, 12 and 13 show the installation of the clip 110 into a hollow structural member 111 that may be made, e.g., from extruded aluminum or plastic. The member 111 has a wall 111W with a shallow U cross sectional shape. Slot S1 in the wall 111W receives the second and third panels 118, 122. When the clip 110 is rotated (counterclockwise in these views), the support wings 129 extend into slots S2A and S2B and the aperture 132D aligns with aperture A1 in 111W and apertures 132A1, 132A2 align with aperture A2 in wall 111W. Because the clip 110 is partially inserted into the hollow member 111 from the outside and second leg 120, first panel 114 and third leg 126 remain on the outside of the member 111, the arrangement can be designated an "outside mount" of the clip 110. When fully inserted into the slots S2A, S2B, the support wings 129 bear against the slots S2A, S2B and/or the interior 111I of member 111 to resist torsional forces F1, F2 (See FIG. 4) that may be exerted on the clip 110.

Figure 14:
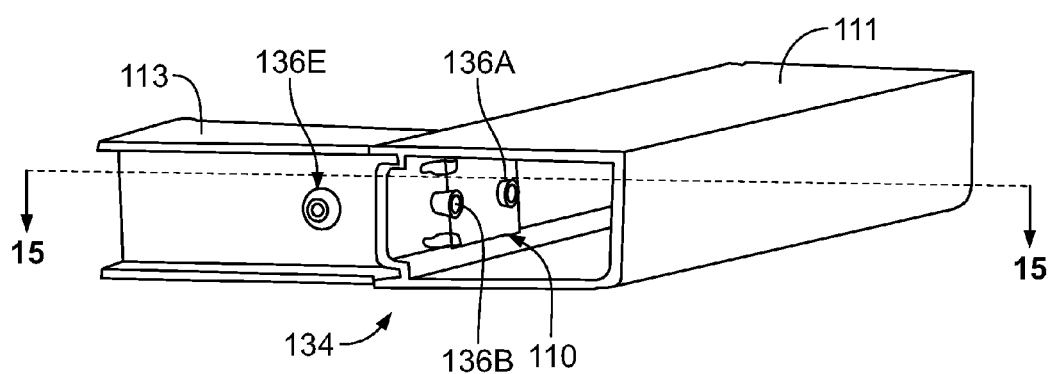
FIG. 14 is a perspective view of the clip and hollow member of FIG. 13 coupled to an adjacent member to form an assembly.
Figure 15:
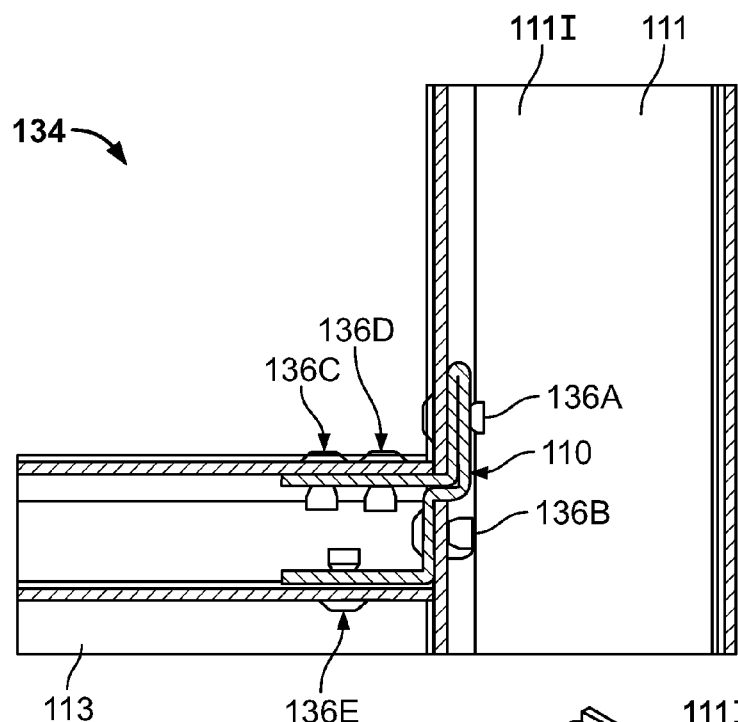
FIG. 15 is a cross-sectional view of the assembly of FIG. 14.
Figure 16:
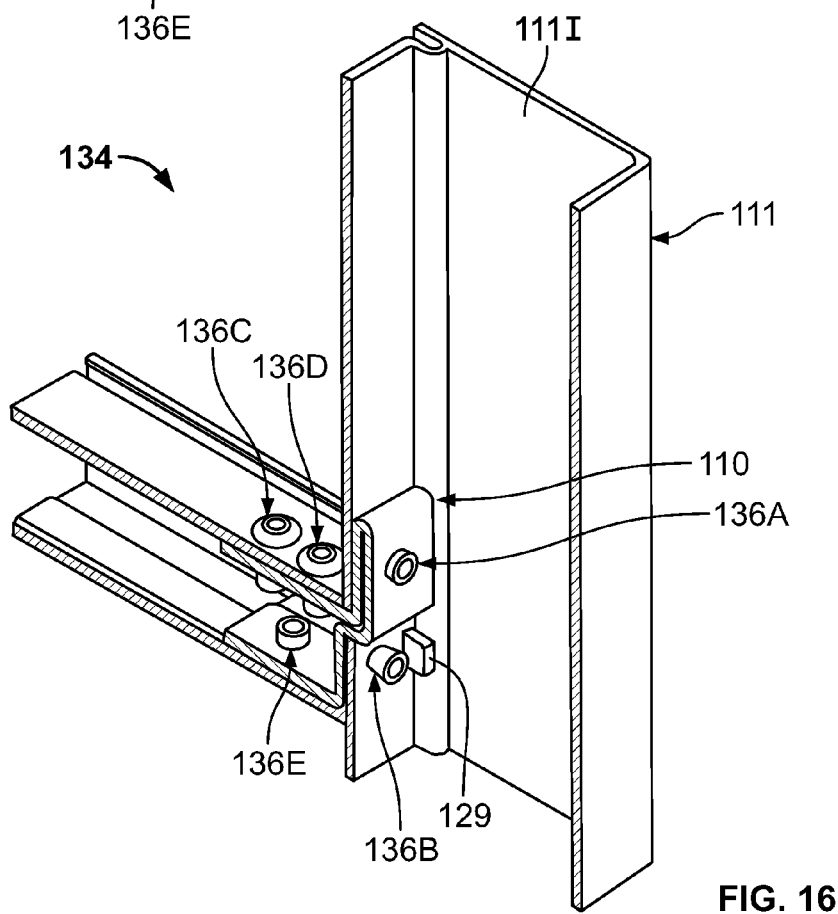
FIG. 16 is a perspective view of the cross-section of the assembly of FIG. 15.

FIGS. 14-16 show an assembly 134 formed from members 111, 113 and conjoined by clip 110 and fasteners 136A-136E. The fasteners 136A-136E may be "blind fasteners," such as pop rivets that can be applied from one side of an assembly and have a head portion H and an expandable portion M, which is inserted through the aligned apertures, e.g., A1, 132A1, 132A2 and then expanded to enlarge the expandable portion M to a dimension larger than the apertures A1, 132A1, 132A2, clamping the member 111 to the clip 110. The member 113 is similarly held to the clip 110 by the action of fasteners 136C, 136D and 136E. Other types of fasteners 136 may be used, such as machine or self-threading screws or bolts with mating nuts.

Figure 17:
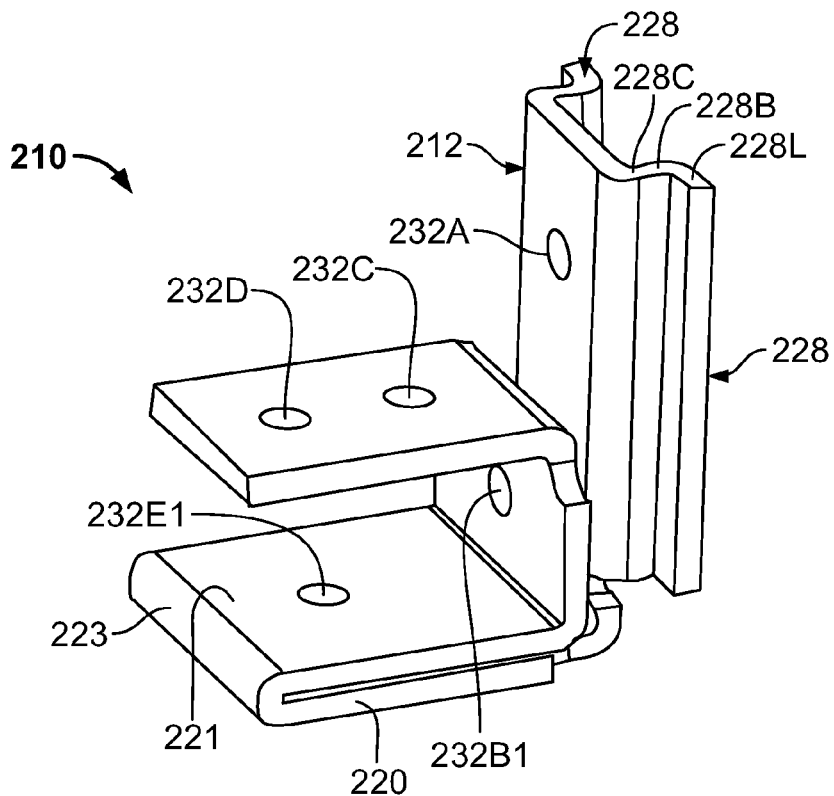
FIG. 17 is perspective view of a clip for assembling members in accordance with another embodiment of the present disclosure.
Figure 18:
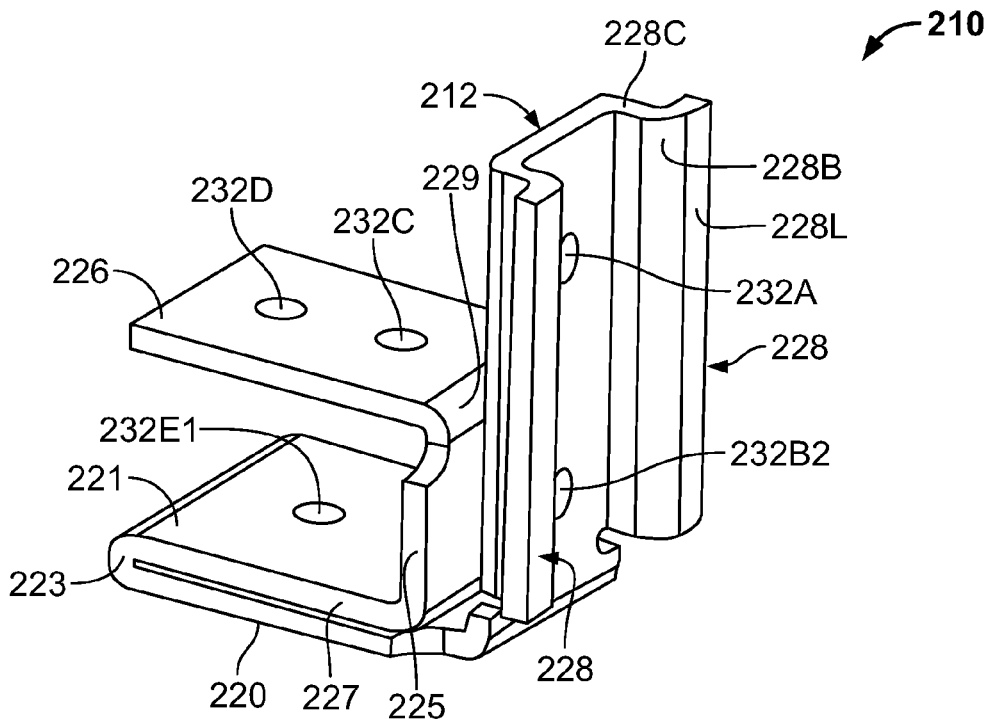
FIG. 18 is a perspective view of the clip of FIG. 17 looking from another direction.

FIGS. 17 and 18 show a clip 210 for assembling members 211, 213 (see FIG. 21) in accordance with an embodiment of the present disclosure. The clip 210 could be described as having an L configuration with a first leg 212 having a flattened U shaped cross section. A second leg 220 extends at an angle, e.g., 90 degrees from the first leg 212, defining the bottom portion of the L shape. A third panel 221 extends back from a reverse curve 223, such that the third panel 221 extends parallel to the second leg 220. An upright panel 225 extends from curve 227 parallel to and spaced from first leg 212 by a spacing approximating the thickness of wall 211W and ends in curve 229. A forth panel 226 extends from curve 229 parallel to panels 220 and 221. The clip 210 could be described as L shaped with a U shaped element composed of panels 221, 225 and 226 attached to the bottom leg 220, such that the bottom portion of the L is bifurcated.

A pair of support wings 228 extend from opposite sides of the first leg 212 with a connected portion 228C extending at an angle, e.g., 90 degrees relative to the first leg 212 to a bend 228B of, e.g., 90 degrees from which a lip 228L extends. Holes 232A-232E2 permit the passage of fasteners like rivets, screws, bolts, etc. through the clip 210.

Figure 19:
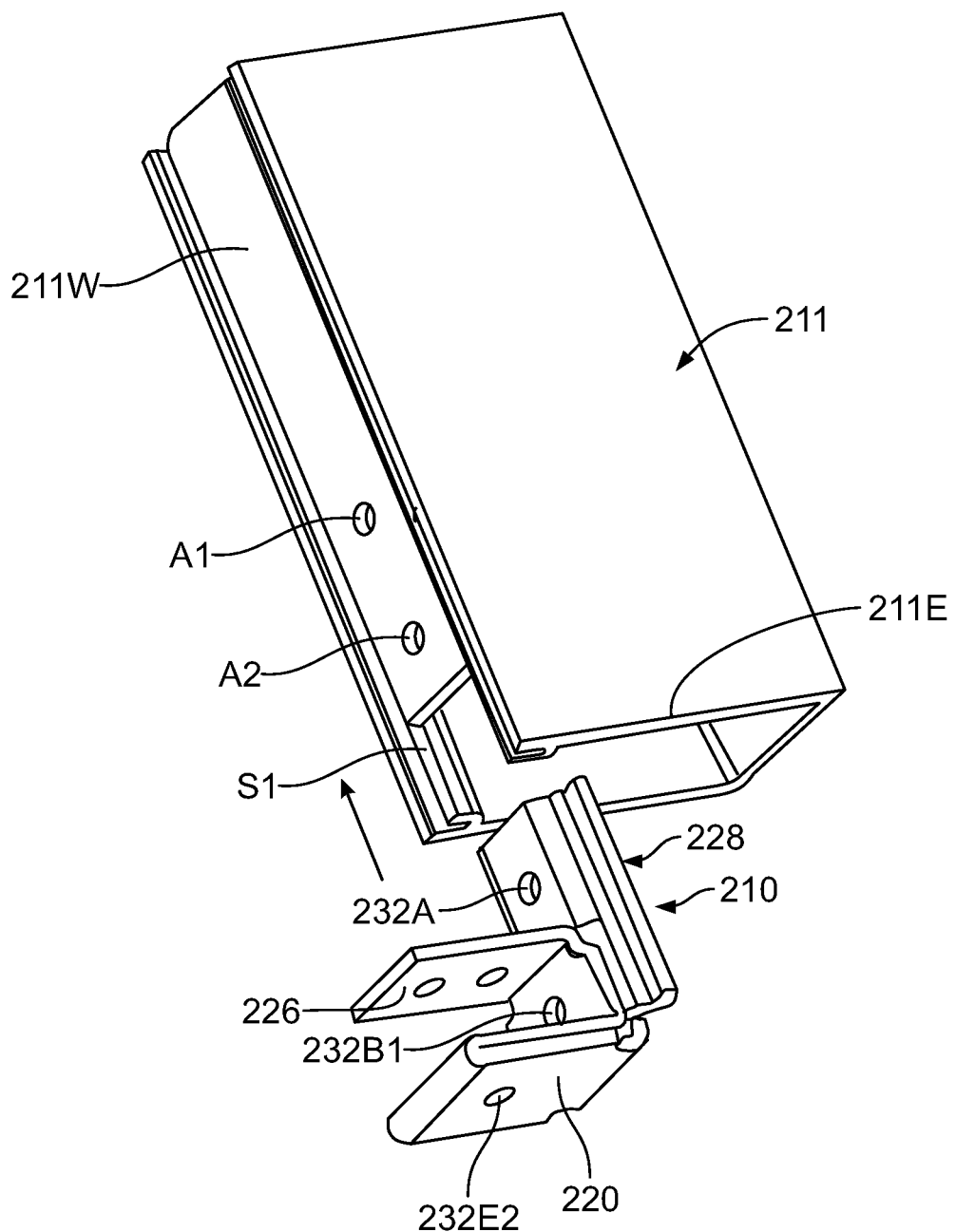
FIG. 19 is a perspective view of the clip of FIGS. 17 and 18 in position for insertion into a first hollow member.
Figure 20:
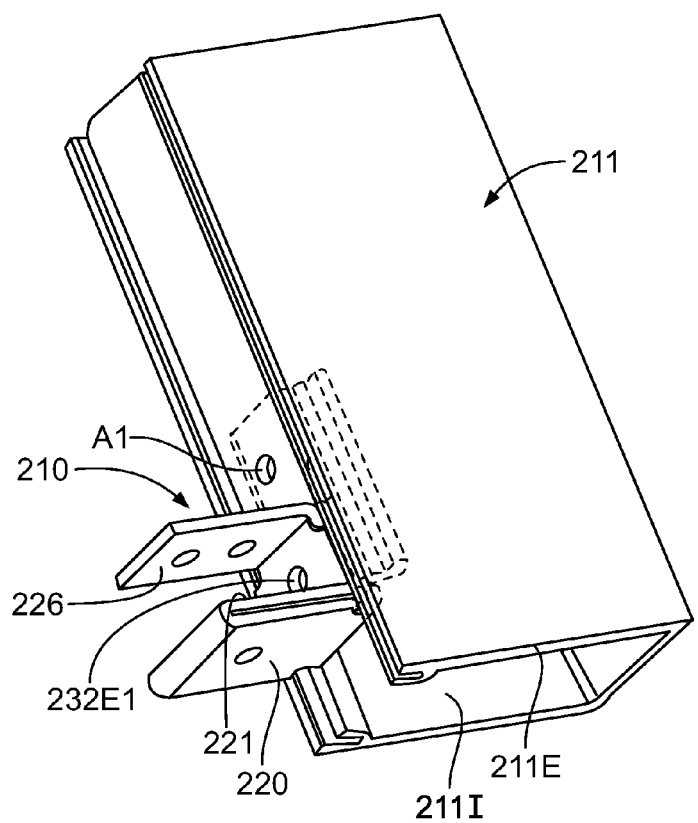
FIG. 20 is a partially phantom, perspective view of the clip of FIG. 19 positioned within the first hollow member.

FIGS. 19 and 20 show the installation of the clip 210 into a hollow structural member 211 that may be made, e.g., from extruded aluminum or plastic. The member 211 has a wall 211W with a shallow U cross sectional shape. A slot S1 in the wall 211W accommodates the clip 210 allowing the leg 220 to project from a level above that of the edge 211E of the member 211 and allowing the apertures A1 and A2 to align with holes 232A and 232B1/232B2 (232B2 is not visible in this view). The slot S1 may extend up the wall 211W to any selected extent, so long as the apertures A1, A2, which may occupy any selected position, are positioned to align with the apertures 232A, 232B1/232B2 for given slot S1 dimensions. Because the clip 210 is slipped into the hollow member 211 via the slot and the spacing between panel 225 and leg 212, the arrangement can be designated a "slide mount" of the clip 210. When fully inserted into the slot S1 and fastened by fasteners, as shown in FIG. 21, the support wings 228, being complementarily shaped relative to the shallow U shaped wall 211W, bear against the wall 211W and/or the interior 211I of the member 211 to resist torsional forces F1, F2 that may be exerted on the clip 210 and/or members 211, 213.

Figure 21:
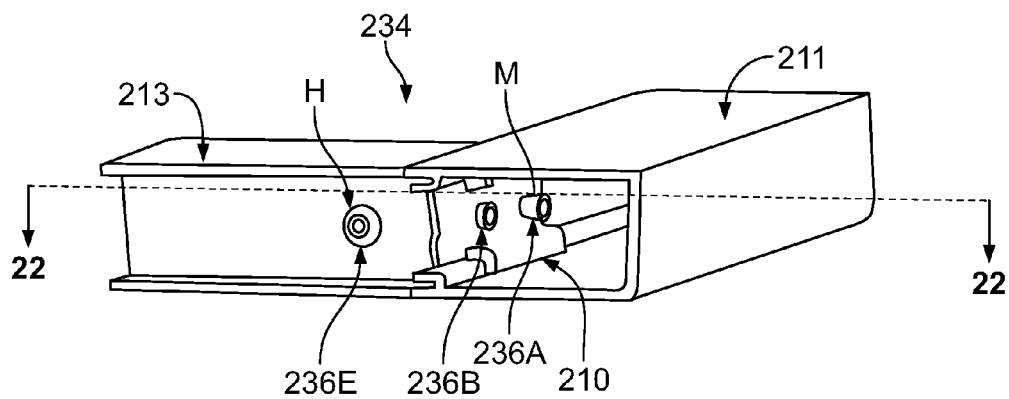
FIG. 21 is a perspective view of the clip and hollow member of FIG. 20 coupled to an adjacent member to form an assembly.
Figure 22:
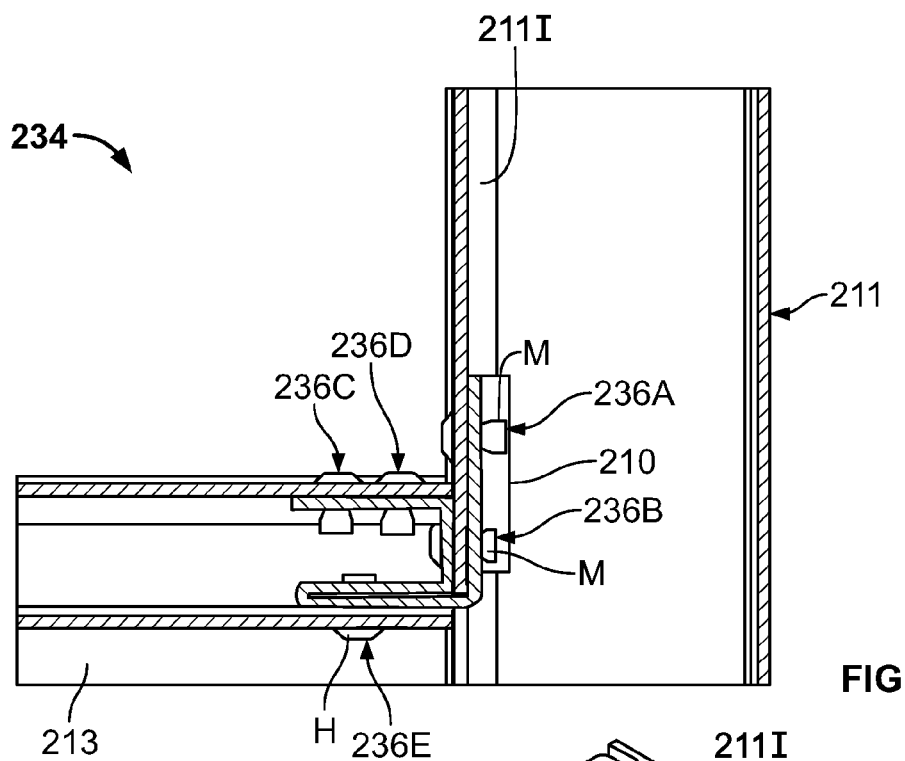
FIG. 22 is a cross-sectional view of the assembly of FIG. 21.
Figure 23:
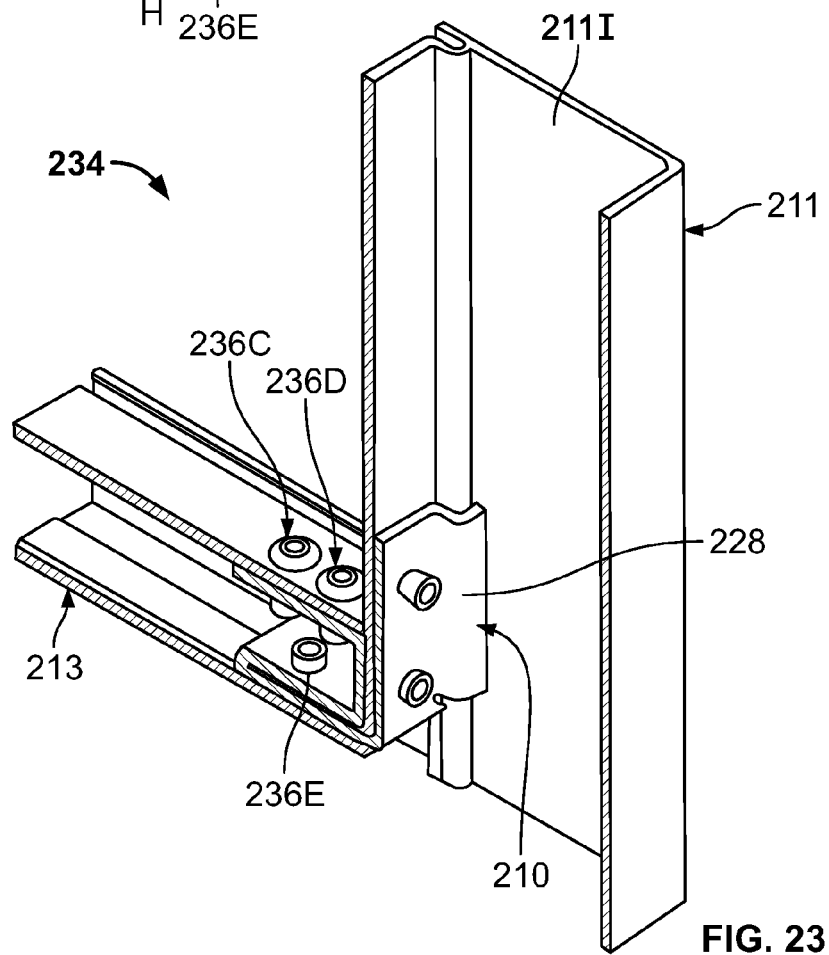
FIG. 23 is a perspective view of the cross-section of the assembly of FIG. 22.

FIGS. 21-23 show an assembly 234 formed from members 211, 213 and conjoined by clip 210 and fasteners 236A-236E. The fasteners 236A-236E may be "blind fasteners," such as pop rivets that can be applied from one side of an assembly and have a head portion H, which is larger than the apertures A1, A2 in the member 211 (member 213 having similar apertures) and an expandable portion M, which is inserted through the aligned apertures, e.g., A1, 232A and then expanded to enlarge the expandable portion M to a dimension larger than the aperture 232A and clamping the member 211 to the clip 210. The member 213 is similarly held to the clip 210 by the action of fasteners 236C, 236D and 236E. Other types of fasteners 236 may be used, such as machine or self-threading screws or bolts with mating nuts.

Figure 24:
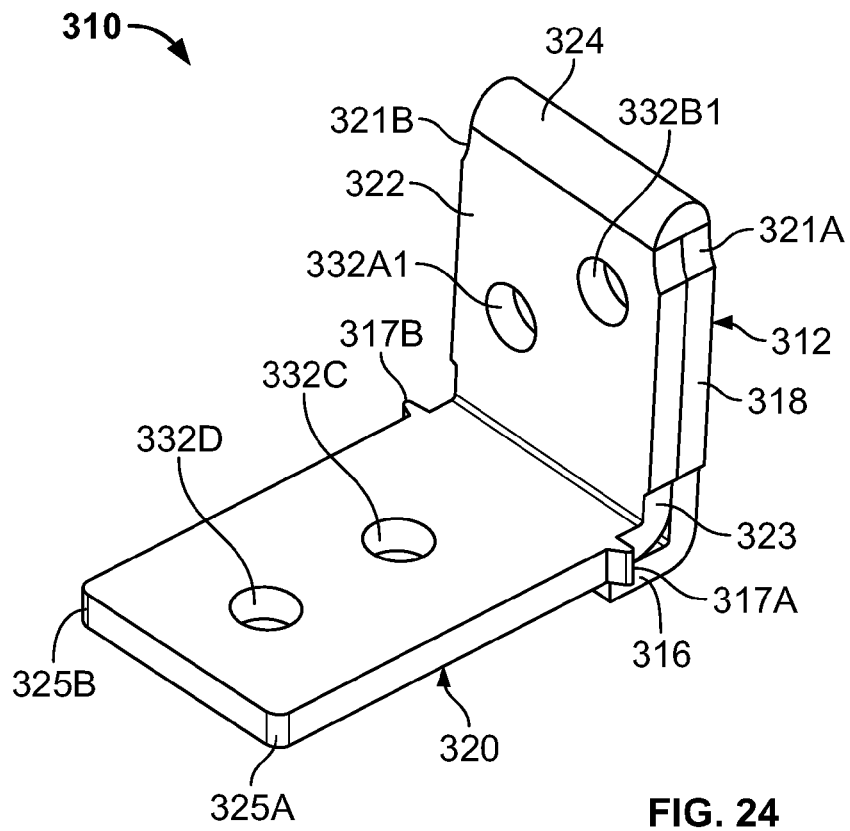
FIG. 24 is perspective view of a clip for assembling members in accordance with another embodiment of the present disclosure.
Figure 25:
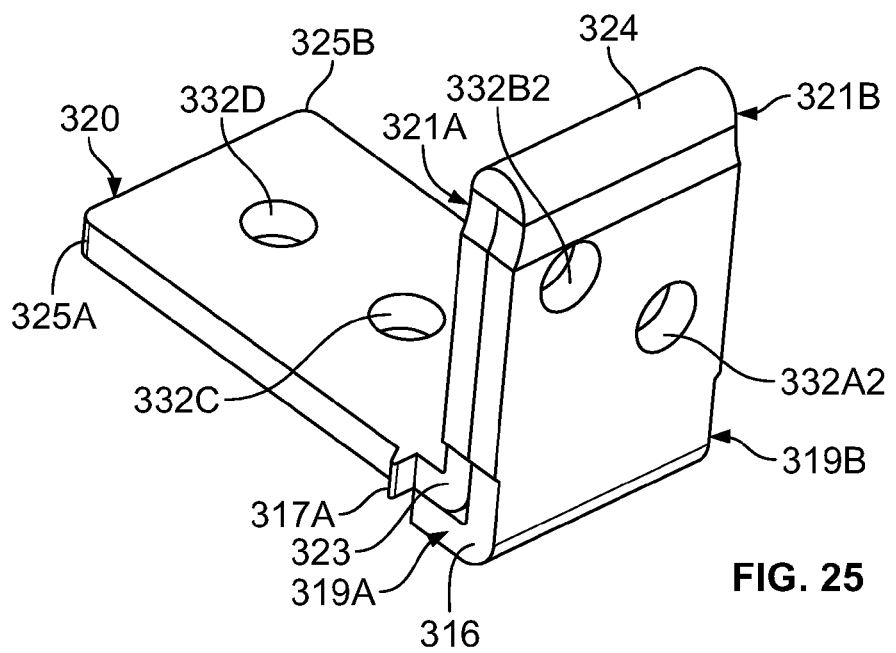
FIG. 25 is a perspective view of the clip of FIG. 24 looking from another direction.

FIGS. 24 and 25 show a clip 310 for assembling members 311, 313 (see FIG. 29) in accordance with an embodiment of the present disclosure. The clip 310 could be described as having an L configuration with a first leg 312 having a stub 316 extending at an angle, e.g., 90 degrees, from a first panel 318. A second leg 320 extends at an angle, e.g., 90 degrees from a second panel 322, defining the bottom portion of the L shape, the second panel 322 depending from a reverse curve 324 extending from the first panel 318, such that the second panel 322 extends parallel to the first panel 318. The stub 316 extends from the first panel 318 parallel to the second leg 320, bracing the position of the second leg relative to the second panel 322. Holes 332A1-332D permit the passage of fasteners like rivets, screws, bolts, etc. through the clip 310. The clip 310 features two holding tabs 317A, 317B that prevent the clip 310 from passing through a given slot in a hollow member when it is partially inserted therein to assemble a structure, as shall be described below. Reliefs 319A, 319B, 321A and 321B at the reverse curve 324, stub 316 and bend 323 remove the burr that is produced as a consequence of forming a bend at these locations. A burr could interfere with the insertion and rotation of the clip 310 in a close fitting slot in a member to be joined. The clip 310 is also radiused at 325A and 325B to facilitate insertion into a mating slot in a structural member, such as the rail of a door.

Figure 26:
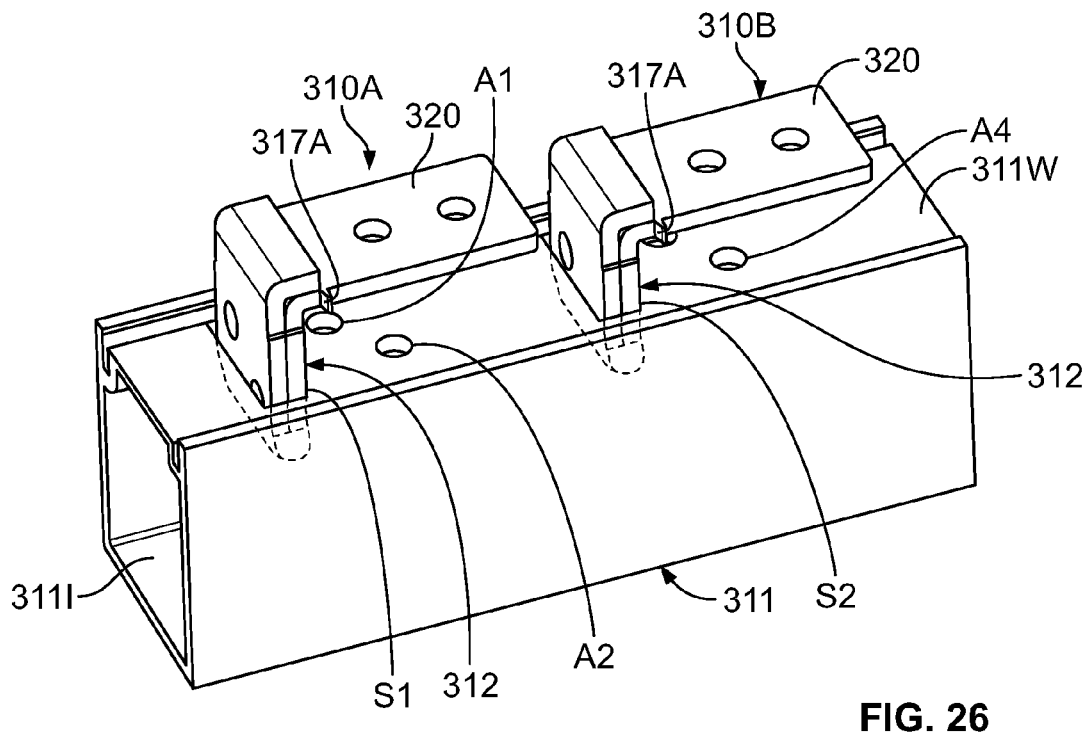
FIG. 26 is a partially phantom, perspective view of a pair of clips shown in FIGS. 24 and 25 in a first insertion position into a pair of slots in a first hollow member.
Figure 27:
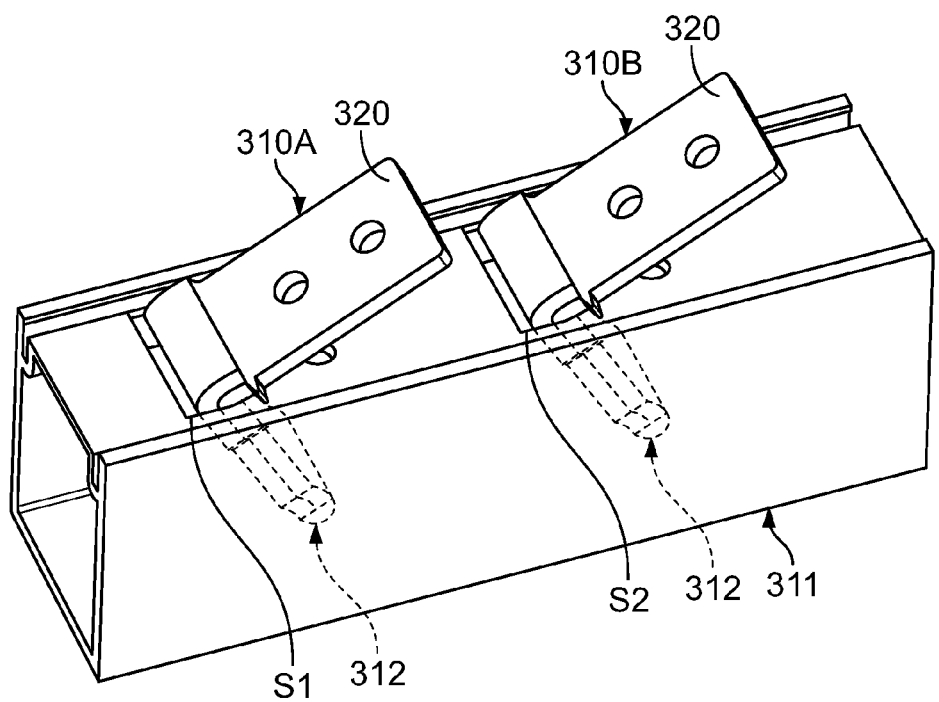
FIG. 27 is a partially phantom, perspective view of the clips of FIG. 26 as they are rotated into a second insertion position within the first hollow member.
Figure 28:
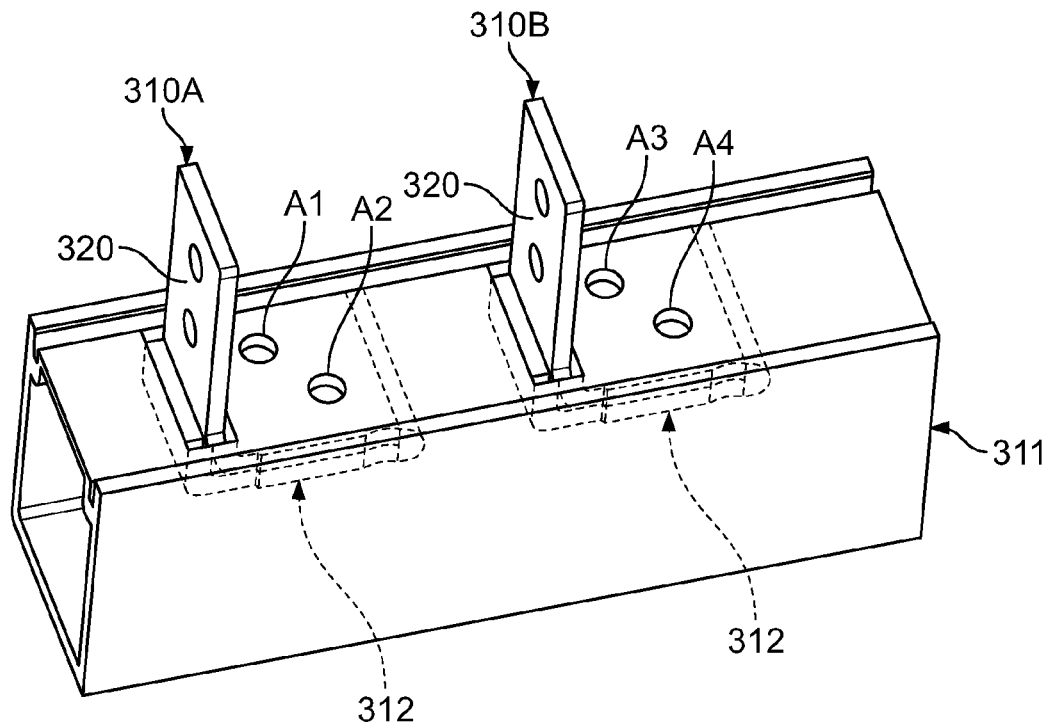
FIG. 28 is a partially phantom perspective view of the clips of FIGS. 26 and 27 in the second insertion position within the first hollow member.

FIGS. 26, 27 and 28 show the installation of a pair of clips 310A, 310B into a hollow structural member 311 that may be made, e.g., from extruded aluminum or plastic. The member 311 has a wall 311W with a shallow U cross sectional shape. Slots S1, S2 in the wall 311W receive the first legs 312 of clips 310A, 310B. When the clips 310A, 310B are inserted fully, the holding tabs 317A, 317B abut against the corresponding slot S1, S2, preventing the clip 310 from passing entirely through the slots S1, S2 into the interior hollow 3111 of the hollow member 311. When the clips 310A, 310B are rotated (counterclockwise in these views), the apertures 332A1/332A2 and 332B1, 332B2 align with apertures A1, A2, A3, A4 in wall 311W. Because the clips 310A, 310B are partially inserted into the hollow member 311 from the outside and second leg 320, remains on the outside of the member 311, the arrangement can be designated an "outside mount" of the clip 310.

Figure 29:
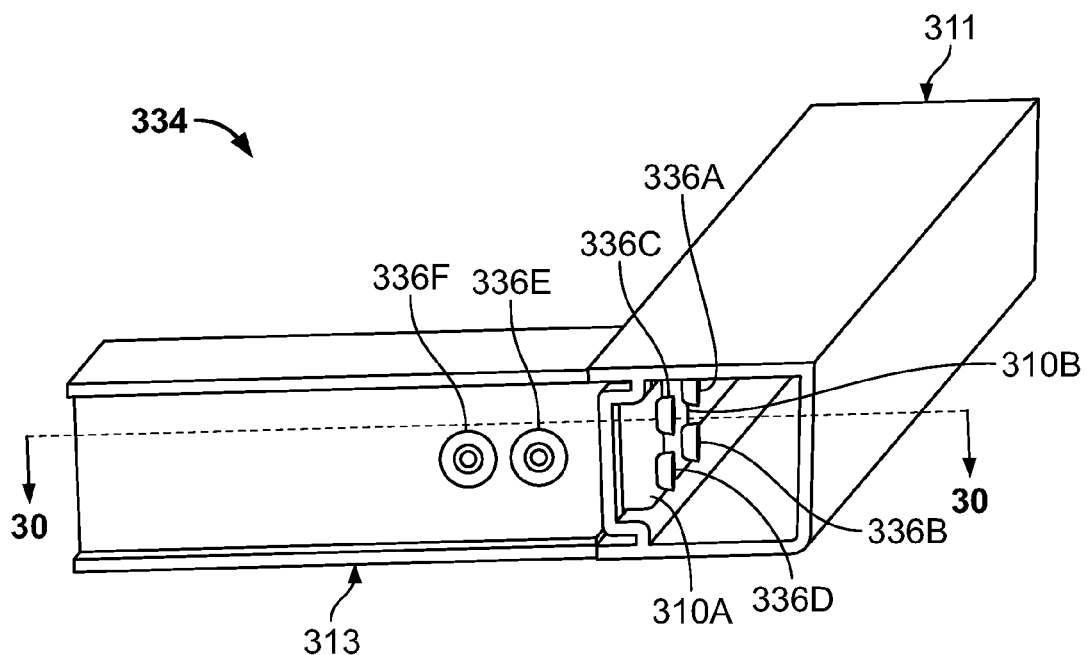
FIG. 29 is a perspective view of the clips and hollow member of FIG. 28 coupled to an adjacent member to form an assembly.
Figure 30:
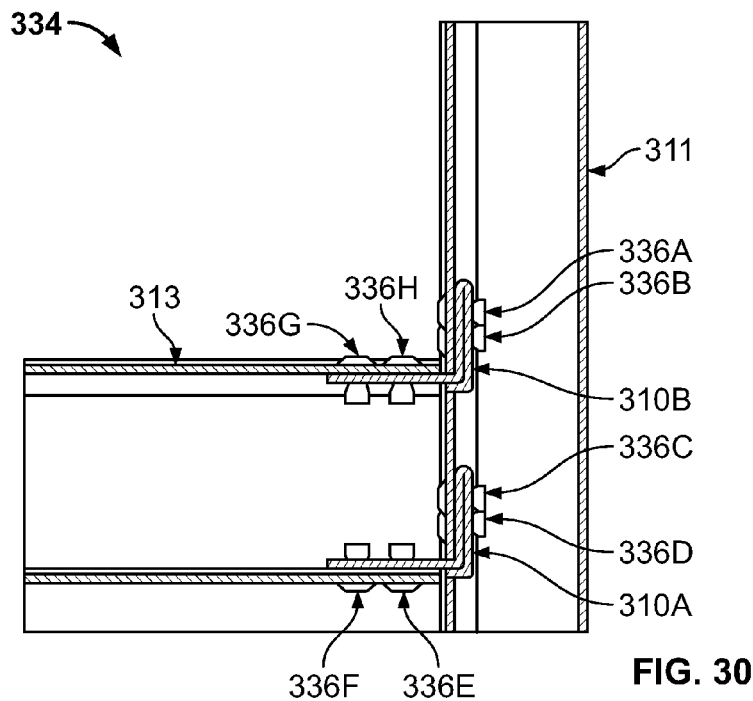
FIG. 30 is a cross-sectional view of the assembly of FIG. 29.
Figure 31:
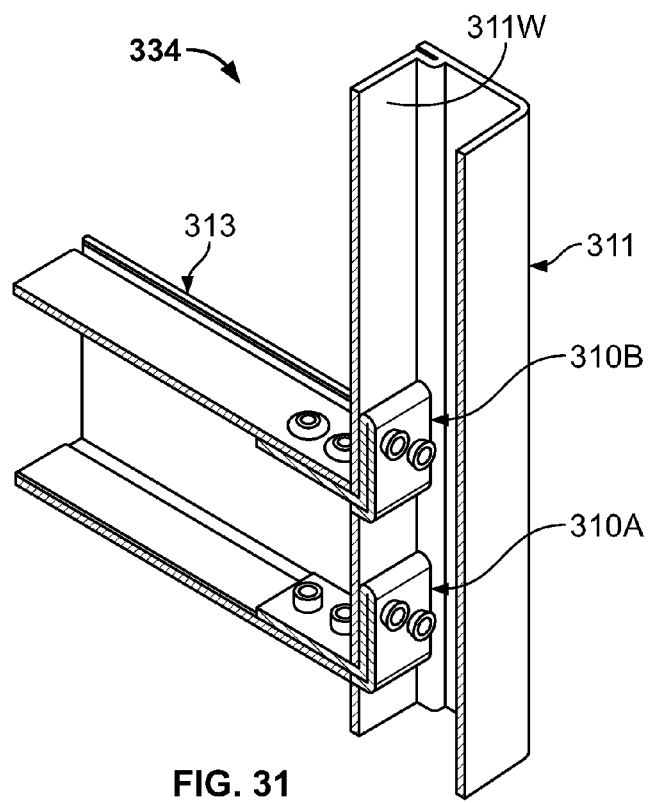
FIG. 31 is a perspective view of the cross-section of the assembly of FIG. 30.

FIGS. 29-31 show an assembly 334 formed from members 311, 313 and conjoined by clips 310A, 310B and fasteners 336A-336H. The fasteners 336A-336H may be "blind fasteners," such as pop rivets that can be applied from one side of an assembly. The member 313 is similarly held to the clips 310A, 310B by the action of fasteners 336E-336H. Other types of fasteners 336 may be used, such as machine or self-threading screws or bolts with mating nuts. The clips 310A, 310B may be used in pairs to join two members e.g., 311, 313. One of the clips connects the upper part of the horizontal extrusion (rail) with the vertical extrusion, (stile), while the other clip joins the lower part of the horizontal extrusion (rail) with the vertical extrusion. Since a pair of clips 310A, 310B can accommodate multiple rails of different dimensions by adjusting the position of the slots S1, S2 and the resultant spacing between the clips 310A, 310B, the clips 310A, 310B could be described as "universal." For structures having less demanding requirements of strength and rigidity, a single clip 310 could be used to fasten two members 311, 313.

It will be understood that the embodiments described herein are merely exemplary and that a person skilled in the art may make many variations and modifications without departing from the spirit and scope of the claimed subject matter. For example, while 90 degree assemblies are shown above, the clip 10, 110, 210, 310 may have a shape other than a 90 degree L, wherein the lower portion of the L is oriented at an acute or obtuse angle relative to the upper portion of the L, so that members 11, 13 may be joined at other than 90 degrees. All such variations and modifications are intended to be included within the scope of the appended claims.

We claim:
1. A structure, comprising:
a first member having an open end and an interior hollow, the open end communicating with the interior hollow thereof, a first wall, a second wall and a third wall conjoining with the first wall on opposite sides thereof defining an interior shape of the first member proximate the first wall;
a second member having an interior hollow and an open end, the open end communicating with the interior hollow thereof;
a clip attaching the first member to the second member, the clip having a first leg and a second leg, conjoined at a first angle forming a first conjunction, a third leg attached to the second leg at an end thereof distal to the first leg forming a second conjunction, the third leg extending along the second leg proximate and substantially parallel to a surface thereof in a direction from the second conjunction toward the first leg and a fourth leg extending from a third conjunction with the third leg distal to the second conjunction, the fourth leg extending parallel to the first leg along a portion of the length of the first leg with a spacing between the fourth leg and the first leg accommodating the first wall of the first member therebetween, the first leg inserted into the hollow in the first member and positioned against the first wall of the first member, the first leg of the clip abutting against an interior surface of the first wall of the first member within the hollow, mating with the interior shape of the first member proximate the first wall, and being fastened to the first member, the fourth leg positioned proximate an exterior surface of the first wall and being fastened to the first wall of the first member exterior to the hollow of the first member, the second leg extending outside the interior hollow of the first member past a terminal end of the first wall proximate the open end of the first member, inserting into the open end of the second member and being fastened to the second member.

2. The structure of claim 1, further comprising a fifth leg attached to the fourth leg at an end thereof distal to the third leg forming a fourth conjunction, the fifth leg extending distal to the first leg and substantially parallel to the direction of extension of the third leg, the third leg, fourth leg and fifth leg forming a U-shape, the second leg, third leg and fifth leg extending into the open end of the second member.

3. The structure of claim 2, wherein the first, second, third, fourth and fifth legs are each formed from a continuous metal strip.

4. The structure of claim 3, wherein the second member has first and second substantially parallel walls bridged by a connecting wall, the first wall of the second member fastened to the second leg of the clip and the second wall of the second member fastened to the fifth leg.

5. The structure of claim 4, wherein the first leg and the fourth leg of the clip have fastener apertures therein that align with an aperture in the first wall of the first member, wherein the second and third legs have apertures that align with an aperture in the first wall of the second member, and wherein the fifth leg has an aperture therein which aligns with an aperture in the second wall of the second member and further comprising a plurality of fasteners extending through the aligned apertures of the clip and the first and second members securing the clip to the first member and the second member.

6. The structure of claim 5, wherein the fasteners are blind rivets.

7. The structure of claim 2, further comprising a pair of support wings extending from opposite sides of the first leg, the support wings mating with the interior shape of the first member.

8. The structure of claim 7, wherein each of the support wings include a connector portion that extends at an angle from the first leg and a lip that extends at an angle from the connector portion.

9. The structure of claim 8, wherein the connector portion extends at about 90° from the first leg and the lip extends at about 90° from the connector portion.

10. The structure of claim 2, wherein the first wall of the first member has a slot accommodating the clip at a position spaced above an end of the first member.

11. The structure of claim 10, wherein the first wall of the first member has a shallow U-shaped cross-sectional shape having a bottom portion and a pair of short end portions and wherein opposing outer edges of the first conjunction are relieved and the widths of the first leg and the first conjunction approximate the width of the bottom portion of the shallow U-shape allowing the first leg to be accommodated between the end portions of the shallow U-shape.

12. The structure of claim 11, wherein the second member has first and second substantially parallel walls bridged by a connecting wall, the first wall of the second member fastened to the second leg of the clip and the second wall of the second member fastened to the fifth leg and wherein the second wall of the second member has a shallow U-shaped cross-sectional shape having a bottom portion and a pair of short end portions and wherein opposing outer edges of the fourth conjunction are relieved and the width of the fifth leg and the fourth conjunction approximate the width of the bottom portion of the shallow U-shape of the second wall of the second member, allowing the fifth leg to be accommodated between the end portions of the shallow U-shape.

13. The structure of claim 12, wherein the second member has a fourth wall parallel to and spaced from the connecting wall and bridging between the first wall and the second wall of the second member to define a tubular structure, the second leg and third leg of the clip being fastened to the first wall of the second member, the width of the second leg and the third leg approximating the distance between the fourth wall and the connecting wall of the second member.

14. The structure of claim 1, wherein
the first wall of the first member has a shallow U-shaped cross-sectional shape having a bottom portion of the U-shape and a pair of short end portions of the U-shape and the widths of the first leg and the first conjunction approximate the width of the bottom portion of the U-shape allowing the first leg to be accommodated between the end portions of the U-shape, a pair of support wings extending from opposite sides of the first leg, the support wings mating with the interior shape of the first member and overlapping the short end portions of the U-shape.

15. The structure of claim 14, wherein each of the support wings include a connector portion that extends at an angle from the first leg and a lip that extends at an angle from the connector portion.

16. The structure of claim 15, wherein the clip has a plurality of fastener apertures formed therein and the first member and the second member each have at least one fastener aperture therein, the plurality of fastener apertures of the clip and the apertures in the first member and the second member being aligned in an assembly orientation, and further including a plurality of fasteners inserted through the aligned fastener apertures of the clip and the first and second members to fasten the first and second members to the clip.

17. The structure of claim 1, wherein the first and second members are tubular extrusions of aluminum alloy.

18. The structure of claim 17, wherein the structure is a portion of a door.

19. A structure, comprising:
a first tubular member having an interior hollow and an open end communicating with the interior hollow, a first wall, a second wall and a third wall conjoining with the first wall on opposite sides thereof defining an interior shape of the first member proximate the first wall;
a second tubular member having an interior hollow and an open end, the open end communicating with the interior hollow thereof;
a clip attaching the first member to the second member, the clip having a first leg and a second leg, conjoined at a first angle forming a first conjunction,
the first leg inserted into the hollow in the first member and positioned against the first wall of the first member, the first leg of the clip abutting against the first wall of the first member and being fastened to the first member, the first leg mating with the interior shape of the first member proximate the first wall,
the second leg extending outside the interior hollow of the first member past a terminal end of the first wall proximate the open end of the first member, inserting into the open end of the second member and being fastened to the second member, a third leg attached to the second leg at an end thereof distal to the first leg forming a second conjunction, the third leg extending along the second leg proximate and substantially parallel to a surface thereof in a direction from the second conjunction toward the first leg and a fourth leg extending from a third conjunction with the third leg distal to the second conjunction, the fourth leg extending parallel to the first leg along a portion of the length of the first leg with a spacing between the fourth leg and the first leg accommodating the first wall of the first member therebetween, the fourth leg positioned proximate an exterior surface of the first wall and being fastened to the first wall of the first member exterior to the hollow of the first member, a fifth leg attached to the fourth leg at an end thereof distal to the third leg forming a fourth conjunction, the fifth leg extending distal to the first leg and substantially parallel to the direction of extension of the third leg, the third leg, fourth leg and fifth leg forming a U-shape, the second leg, third leg and fifth leg extending into the open end of the second member and attaching thereto.

20. The structure of claim 19, wherein the first wall of the first member has a shallow U-shaped cross-sectional shape having a bottom portion of the U-shape and a pair of short end portions of the U-shape and wherein opposing outer edges of the first conjunction are relieved, and the widths of the first leg and the first conjunction approximate the width of the bottom portion of the U-shape allowing the first leg to be accommodated between the end portions of the U-shape and wherein a wall of the second member has a shallow U-shaped cross-sectional shape having a bottom portion of the U-shape and a pair of short end portions of the U-shape and wherein opposing outer edges of the fourth conjunction are relieved and the width of the fifth leg and the fourth conjunction approximate the width of the bottom portion of the U-shape of the wall of the second member, allowing the fifth leg to be accommodated between the end portions of the U-shape.

* * * * *